March 20, 1962 A. E. VOGEL 3,026,125
CONTROL SYSTEM FOR VEHICLE SUSPENSION
Original Filed Oct. 19, 1955 3 Sheets-Sheet 2

INVENTOR.
ARTHUR E. VOGEL
BY Schmieding and Fultz
ATTORNEYS

INVENTOR.
ARTHUR E. VOGEL
BY Schmieding and Fultz
ATTORNEYS

United States Patent Office 3,026,125
Patented Mar. 20, 1962

3,026,125
CONTROL SYSTEM FOR VEHICLE SUSPENSION
Arthur E. Vogel, Columbus, Ohio, assignor to Dawson-Vogel Engineering Company, Columbus, Ohio
Original application Oct. 19, 1955, Ser. No. 541,337. Divided and this application Mar. 27, 1958, Ser. No. 724,425
9 Claims. (Cl. 280—124)

The present invention relates to suspension system for vehicles and more particularly to a novel apparatus for automatically controlling such systems.

This application is a division of my co-pending application Serial No. 541,337 filed October 19, 1955 which is a continuation-in-part of co-pending application Serial No. 519,079 of Arthur E. Vogel filed June 30, 1955, now abandoned.

In general, the present apparatus is applied to motor vehicles of the type which comprise a sprung weight portion supported by four unsprung weight portions each of which includes a wheel and an independent spring means.

It is one object of the present invention to provide a novel suspension system that incorporates a closed fluid circuit containing a compressible fluid, such as air, that is transferred into and out of sealed flexible casings, or air springs, connected between the sprung and unsprung weights of the vehicle. According to the present invention, the expenditure of fluid energy required to control the suspension system is decreased through use of a novel fluid circuit for the system, whereby savings in horsepower consumed by the system are realized.

It is another aspect of the present invention to provide a control system which permits completely independent suspension operation at each of the four unsprung portions of a vehicle, with each of said portions being adapted to sense the particular condition to which it is being subjected, and to make an appropriate corresponding variation in the force exerted by its respective spring means. As a result, improved cornering characteristics and riding comfort are realized under all road conditions to which the vehicle is subjected.

It is another aspect of the present invention to provide a control system for vehicle suspensions adapted to maintain a normal suspension configuration between sprung and unsprung weight portions of a vehicle, said control system being adapted to vary the force exerted by the spring means of the vehicle by transferring fluid energy to and from such spring means. Such transfer of fluid energy is instituted after a time delay to prevent response of the control system to road imposed impacts of a short time duration. After the control system returns the sprung and unsprung weight portions to normal configuration, however, the transfer of fluid is caused to cease without such time delay whereby the sprung and unsprung weights are positively arrested at normal configuration without the occurrence of hunting or oscillation of the system above and below the normal configuration datum.

It is another aspect of the present invention to provide a control system for vehicle suspensions which system includes a novel inertia responsive switch means that serves to rapidly render inoperative a time delay mechanism in the control system when the vehicle enters a curve so that the control system will effect anti-roll corrections at the outset of the curve. The novel switch means further includes a holding relay for automatically retaining the time delay mechanism inoperative for a time interval subsequent to completion of the curve so that the control system will rapidly remove the previously applied anti-roll correction which was required in the curve. Hence the vehicle will not remain in a banked configuration for a period after the vehicle completes the curve and the passengers of the vehicle will not be subjected to transition sensations as the vehicle leaves a curve and enters a stretch of straight road.

Further objects and advantages of the present invention will be apparent from the following description, reference being had to the accompanying drawings wherein preferred forms of embodiments of the invention are clearly shown.

In the drawing:

FIGURE 3 is a top elevational view of a fluid actuated valve unit comprising a portion of the control means of FIGURE 1;

FIGURE 4 is a bottom elevational view of the fluid actuated valve unit of FIGURE 3.

Figure 2:
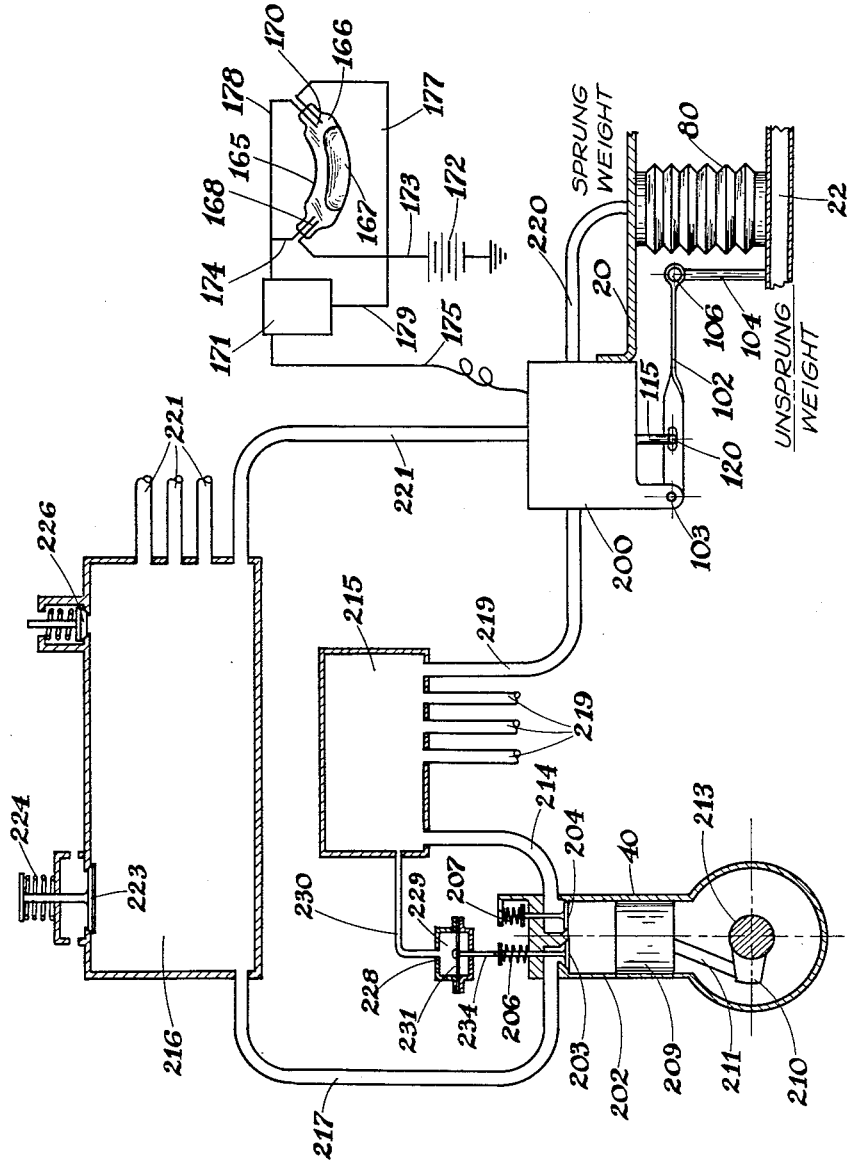
FIGURE 2 is a diagrammatic view of a novel control system and fluid circuit constructed according to the present invention.

Referring in detail to the drawing, FIGURE 2 illustrates a suspension system constructed according to the present invention. The sprung weight of a vehicle is indicated at 20 and the unsprung weight of said vehicle is indicated at 22. A resilient arm 102 is connected to a rod 104 by a pivot pin 106. This rod 104 is suitably attached to the unsprung weight 22. The lower end of a rod 115 is fastened to resilient arm 102 by a pin 120, and the arm 102 is connected to the valve casing 200 by pivot pin 103. The upper end of rod 115 is operatively connected to a control means 200, later to be described in detail.

For the sake of simplicity, a compressor 40, is shown as of the reciprocating type including a cylinder 202, having an air inlet valve 203 and an air outlet valve 204. Valve 203 is upwardly urged towards the closed position by a spring 206, and valve 204 is downwardly urged towards the closed position by a spring 207. The compressor also includes a reciprocating piston 209 which is connected with a crank shaft 210 by a connecting rod 211. The shaft of the compressor is shown at 213. Compressed air is forced through the outlet valve 294 and line 214 to a high pressure reservoir 215. Air is fed to the compressor through valve 203 from a relatively low pressure reservoir 216 via line 217.

A control means 200 is provided for each of the sealed casings 80 and each is fed from the high pressure reservoir 215 through a line 219, control means 200, and line 220. Air is exhausted from each of the casings 80 to the pipe 220, control means 200, and line 221, one line being provided for each of the four chambers 80.

Instead of exhausting the air from the chamber 80 to atmosphere, the lines 221 are connected to the relatively low pressure reservoir 216. This reservoir is provided with an inlet valve 223 which is urged to closed position by a spring 224. Such spring is of light construction and is merely used to hold the valve closed in the event that the air within the reservoir 216 is at atmospheric pressure. Normally, however, the pressure within reservoir 216 is substantially above atmospheric pressure. Air cannot escape reservoir 216 except through line 217 or a pressure relief valve 226. As an example, the air pressure normally existing within the relatively low pressure reservoir 216 is at forty pounds per square inch, that in the chamber 80 is approximately 80 pounds per square inch, and that in the high pressure reservoir 215 approximately 120 pounds per square inch. Far less energy is expended in raising the pressure from 40 pounds per square inch to 120 pounds per square inch than would be expended in increasing the pressure of atmospheric air to 120 pounds per square inch. Thus by maintaining a pressure of 40 pounds per square inch, for example, in the relatively low pressure reservoir 216, the system is operated more economically. The maximum high pressure within reservoir 215 can be controlled by a controller 228 which includes a chamber 229 connected by a line 230 to the reservoir 215. One of the walls 231 of the controller 228 is flexible and a rod 234 is engageable with the top of inlet valve 203. When the pressure within the reservoir 215 attains the desired maximum, valve 203 will be forced downwardly by the diaphragm 231 and rod 234 to partly open the inlet valve 203. By partially opening valve 203, and preventing it from returning to its seat, the air is merely oscillated between the line 217 and the cylinder 202. After the requirements of chambers 80 cause the pressure in high pressure reservoir 215 to drop below the maximum at which the controller 228 opens the intake valve 203, then the intake valve 203 will be returned to its seat and compressor 40 will resume normal operation and supply air to the high pressure reservoir 215.

Figure 1:
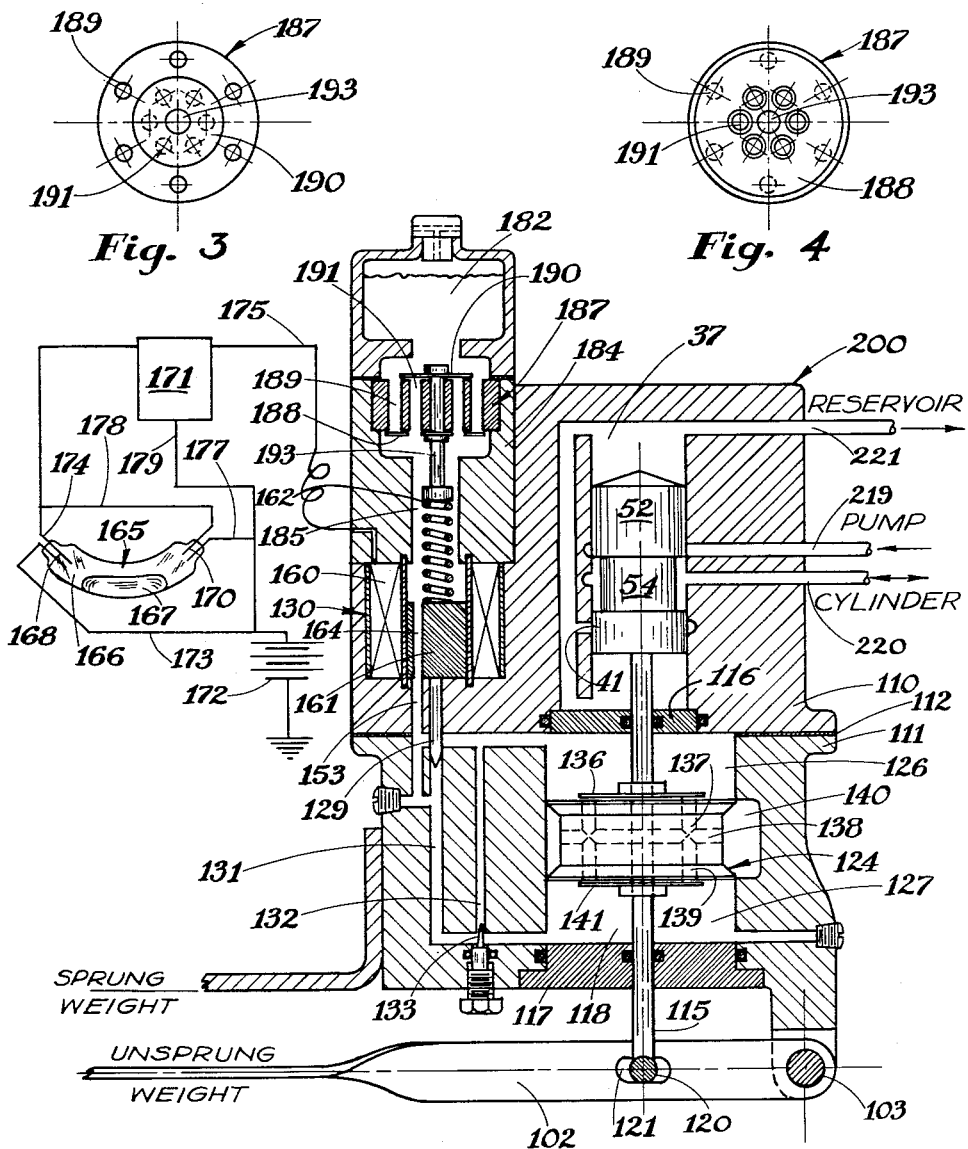
FIG. 1 is a side sectional view constructed according to the present invention.

Referring next to FIGURE 1, control means 200 includes a spool 52 slideably fitted in a cylinder 37 and provided with a necked portion 54. When spool 52 moves upwardly, high pressure reservoir 215 delivers air through line 219 to flexible casing 80 since line 220 is then connected to line 219 by necked portion 54 of the spool.

When spool 52 moves downwardly from the position illustrated in FIGURE 1, flexible casing 80 is connected to low pressure reservoir 216 since the port 41, and hence the line 221, are connected to line 220 by the necked portion 54 of the spool.

When spool 52 is in the normal position illustrated in FIGURE 1, which is the case when no correction for static or inertia load variation is being made by the control means, then the interior of flexible casing 80 is isolated from both reservoirs 215 and 216 and the reservoirs are isolated from each other, since spool 52 is then effecting isolation of the lines 219, 220, and 221, one from the other.

With continued reference to control means 200, spool 52 is connected to resilient arm 102 by a rod 115 which rod extends slideably through an upper removable wall 116 and a lower removable wall 117 of a chamber 118. The lower end of rod 115 is pivotally and slideably connected to resilient arm 102 by a pin 120 extended through a slot 121.

A valve movement retarding means, indicated generally at 124, is mounted on rod 115 and in sealed sliding engagement with the inner wall of chamber 118.

Retarding means 124 is illustrated in the normal position it occupies when the suspension system is in a normal configuration shown in FIGURE 1 in which configuration the sprung weight 20 is a normal static load distance from the unsprung weight 22 and the spool 52 is effecting isolation of lines 219, 220, and 221, one from the other.

When retarding means 124 is urged upwardly or downwardly, from the normal position illustrated, fluid will be moved, respectively, from an upper chamber portion 126 to a lower chamber portion 127, or from lower chamber portion 127 to upper chamber portion 126. As long as valve element 129 of a time delay valve 130 closes passage 131, as illustrated in FIGURE 1, fluid moving between chamber portions 126 and 127 must pass through a passage 132. This passage 132 is provided with a restrictor 133 which may be formed as an adjustable threaded needle valve 133 carried by lower casing 111 and extended into the lower end of passage 132. It will be understood that the rate of movement of retarding means 124, either upwardly or downwardly from the normal position illustrated, is much slower while the valve element 129 closes the larger passage 131 since, in such instance, the flow rate of fluid between chamber portions 126 and 127 is throttled by the restrictor 133. When valve element 129 of time delay valve 130 is removed from passage 131, however, the fluid can rapidly move between the chamber portions 126 and 127 and the retarding means 124, and spool 52 connected thereto, can move rapidly whereby corrections are rapidly instituted by control means 200.

When the time delay mechanism is operative, and rapid movement of retarding means 124 away from the normal position is prevented, then the resilient arm 102 will bend upwardly or downwardly with rapid relative movement between the sprung and unsprung weight portions, yet when one of such relative movements is retained for a time duration greater than the time delay of the system then such arm provides the necessary force for continuing the movement of retarding means 124 at the slow rate it must move while time delay valve 130 closes passage 131. Hence it is seen that the resilient arm 102 allows rapid relative movement between sprung and unsprung weight portions 20 and 22 at times when movement of retarding means 124 is retarded and cannot follow such rapid relative movements. Accordingly, the control means is rendered inoperative when road imposed impacts of short time duration are encountered. When the vehicle encounters a static load change of relative long time duration, however, such as occurs when the number of passengers is increased or decreased, the resilient arm 102 will bend and continue to bias the retarding means 124 until slow movement thereof moves spool 52 to the appropriate position for the correction required to return the sprung and unsprung weight portions 20 and 22 to the normal configuration at which they are spaced a predetermined distance apart.

When retarding means 124 is urged upwardly by resilient arm 102, as will occur when sprung weight 20 moves downwardly relative to unsprung weight 22, an upper resilient valve member 136 is maintained closed by fluid pressure whereby fluid cannot pass through the passages 137, 138, or 139 to lower chamber 127. Hence fluid is moved either through restricted passage 132 or through both the restricted passage 132 and the larger passage 131 depending on whether or not time delay valve 130 is open or closed.

After retarding means 124 has been moved upwardly, either rapidly or slowly depending on whether or not the time delay valve 130 is open or closed, such retarding means 124 will always move rapidly back to the normal position illustrated, after a correction has been made by the control means. Such rapid return of the retarding means 124 occurs when such retarding means is returning to the central position illustrated since the recess 140 is then in communication with lower chamber portion 127 whereby fluid pressure in such lower chamber portion 127 and recess 140 opens the resilient valve member 136 and fluid can pass readily through passages 137 and 138 and into upper chamber portion 126. Since the cross-sectional areas of passages 137 and 138 are much greater than the effective cross-sectional area of passage 132 at restrictor 133, the fluid transferred between chamber portions 127 and 126 will not slow down movement of retarding means 124 when such means is returning from an upper position until it reaches the normal position illustrated and closes by-pass recess 140.

When retarding means 124 is urged downwardly by resilient arm 102, as would occur when the sprung weight 20 rises relative to unsprung weight 22, then the lower resilient valve member 141 will be maintained closed by fluid pressure and fluid will pass from lower chamber portion 127 to upper chamber portion 126 either through the restricted passage 132 or through both the restricted passage 132 and the larger passage 131 depending on whether the element 129 of time delay valve 130 is in the closed or open position.

Retarding means 124 will return rapidly from a lower position to the normal position illustrated since upper chamber portion 126 is then in communication with recess 140 whereby fluid pressure opens resilient valve member 141 and fluid can pass directly through the passages 138 and 139 and into the lower chamber portion 127 without being forced through the restricted passage 132 until retarding means 124 closes by-pass recess 140.

When retarding means 124 arrives at the normal position illustrated, at the completion of a return movement after a correction has been made, the side of retarding means 124 forms a closure for recess 140 in the manner illustrated in FIGURE 1.

With continued reference to FIGURE 1, a solenoid 160 and core 161 of the time delay valve 130 are mounted in a recess in an upper casing portion 110. A separate casing portion 184 forms a vertical passage 185 which connects reservoir 182 with the chamber portions 126 and 127 by passage 164 through core 161 and passage 153.

For controlling the flow of liquid from reservoir 182 to the chamber portions 126 and 127, a fluid actuated valve unit, indicated generally at 187, is mounted in casing portion 184 below the reservoir 182. Fluid actuated valve unit 187 further provides an escape for any air bubbles which may be present in the hydraulic liquid contained in the control means 200. Such unit 187 includes a lower resilient valve member 188 which prevents the movement of liquid from chamber portions 126 and 127 through passages 189 to reservoir 182 when retarding means 124 is actuated. An upper resilient valve member 190 serves to retain passages 191 closed against fluid flow to reservoir 182 up to a predetermined fluid pressure required in chamber portions 126 and 127 for proper operation of the time delay mechanism located therein. The lower resilient valve member 188 is arranged to permit free passage of hydraulic liquid from reservoir 182 through passages 189 to chamber portions 126 and 127 so that such chambers are always maintained full of liquid notwithstanding any slight leakage which may be present in the hydraulic system.

FIGURE 3 is a top view of fluid actuated valve unit 187 showing upper resilient valve member 190 overlying the passages 191 but being of lesser diameter than the unit whereby the upper ends of passages 189 are uncovered. FIGURE 4 is a bottom view of valve unit 187 showing the lower resilient member 188 underlying the passages 189 and provided with holes corresponding with the locations of passages 191 whereby the lower ends of such passages are alway open to the entry of fluid.

The control means 200 of the system of FIGURE 2 may be provided with an inertia responsive control means to rapidly render the time delay mechanism inoperative when the vehicle is suddenly subjected to a horizontally exerted inertia force such as is the case when the vehicle enters a curve, or at the outset of a braking or accelerating operation. In these instances of vehicle operation, it is desirable to rapidly institute an anti-roll correction at the entry of a curve, or to rapidly resist longitudinal pitching or "nose dive" of the front of the vehicle when the brakes are applied, or to rapidly resist longitudinal pitching of the vehicle during rapid acceleration thereof. By rapidly instituting the correction to be made by the control means, through rendering inoperative the time delay mechanism, lower control means pressures are required to effect stability and the passengers of the vehicle will not be subjected to unpleasant transition sensations as would be the case were the vehicle permitted to materially proceed into a roll or pitching movement before the appropriate correction is instituted by the control means 100.

With reference to FIGURE 1, a horizontally disposed mercury switch is generally indicated at 165. Such switch includes a tube 166 having inclined opposite ends provided with a first pair of contacts 168 and a second pair of contacts 170. A source of electric energy 172 is connected to one of the contacts 168 by wire 173 and the other of the contacts 168 is connected by wire 174 to a holding relay 171, later to be described herein, which relay is in turn connected to solenoid 160 by the wire 175. At the other end of tube 166 one of the contacts 170 is connected to the source of electric energy 172 by the wire 177 and the other of the contacts 170 is connected to the holding relay by the wire 178.

When the quantity of mercury 167 connects either the contacts 168 or the contacts 170 the solenoid 160 is actuated whereby the time delay mechanism is rendered inoperative. It will be understood that when the longitudinal axis of mercury switch 165 is disposed transversely to the longitudinal axis of the vehicle the mercury switch 165 will sense centrifugal force and render inoperative the time delay mechanism when the vehicle encounters a curve.

The same control means 200 can be also utilized to control longitudinal pitching or "nose dive" of the vehicle when the brakes are applied in slowing down or stopping. In such instances it is desirable to render inoperative the time delay mechanism of control means 200 so that an anti-pitch correction will be rapidly instituted before the vehicle has materially progressed into a pitched attitude. To accomplish this a brake operated switch 240, illustrated in FIGURE 5 and later to be described, may be connected in parallel with the mercury switch 165. Hence a single control circuit, using both mercury switch 165 and brake operated switch 240, can be utilized with control means 200 whereby such control means 100 will effect both anti-roll corrections and anti-pitch corrections.

Figure 5:
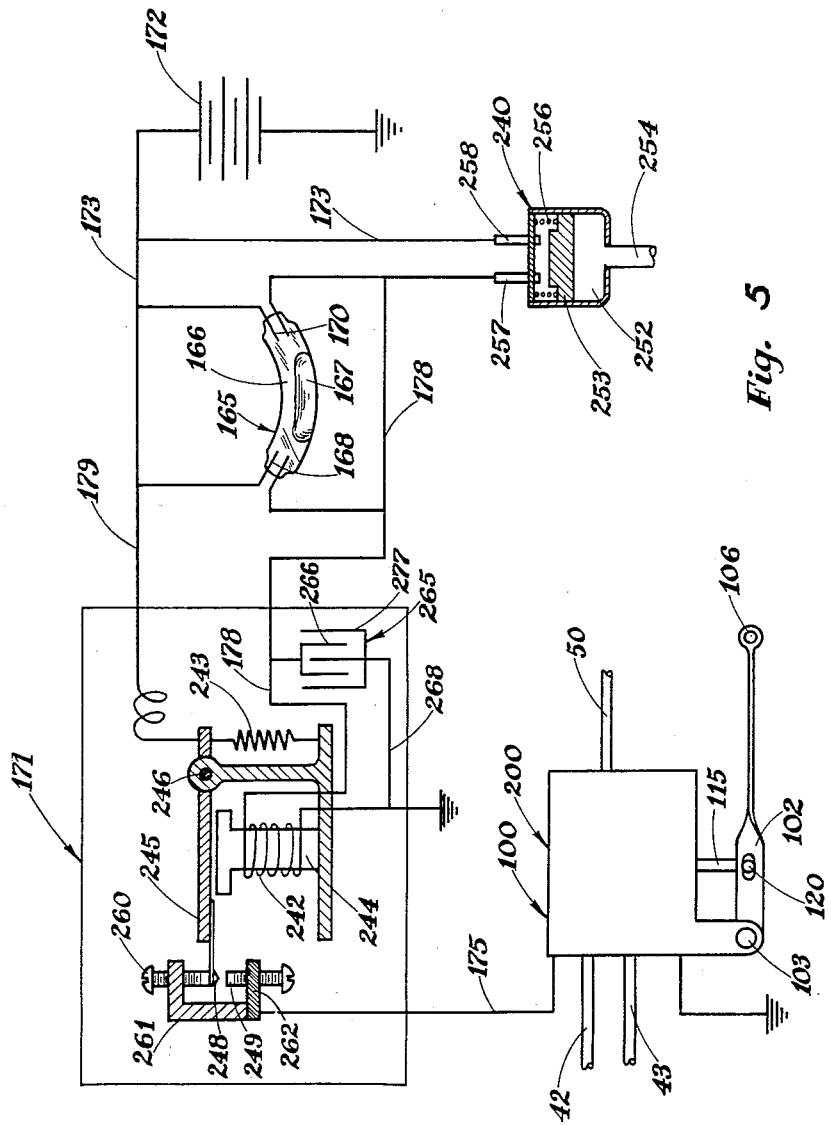
FIGURE 5 is a diagrammatic view showing a novel electric control apparatus utilized with the control means of the present invention and comprising still another aspect thereof.

Reference is next made to FIGURE 5 which diagrammatically illustrates an electrical sensing apparatus adapted to operate the time delay mechanism of the previously described control means 200. A mercury switch 165 is provided with a pair of contact points 168 at one inclined end of a horizontal tube 166 and a second pair of contacts 170 at the other inclined end of the horizontal tube 166. When the quantity of mercury connects either of the pair of contacts 168 or 170, which occurs when the vehicle encounters centrifugal force at curve entry, a solenoid 242 of holding relay 171 is energized and a core becomes magnetized whereby pivoted arm 245 pivots on pin 246 and moves downwardly against the action of tension spring 243 to make contact between an upper contact 248 and a lower contact 249.

The mercury switch contacts 168 connect the source of electricity 172 with solenoid 242 by wires 173 and 178. The other mercury switch contacts 170 connect source 172 with solenoid 242 by wires 173 and 178.

A fluid actuated switch 240 is provided in parallel with mercury switch 165 to render inoperative the electrically operated time delay valve 130 located within the control means 200 when the vehicle encounters an inertia force which would cause longitudinal pitch of the vehicle. Such would occur when the vehicle is to be suddenly decelerated or stopped. Switch 240 includes a fluid chamber 252 fitted with a piston 253. A line 254 leading from chamber 252 can be connected to the hydraulic brake system of the vehicle, or to another suitable source of pressurized fluid. When chamber 252 is pressurized, piston 253 moves upwardly against the action of a return spring 256 whereby piston 253 electrically connects a pair of contacts 257 and 258. The contacts 257 and 258 energize solenoid 242 of holding relay 171 with the source of electric energy by the wires 173 and 178.

The upper contact 248 of relay 171 is provided with an adjustable stop provided by a screw 260 adjustably carried by a dielectric bracket 261 mounted on metallic base 262 which base also adjustably supports lower contact 249. The dielectric bracket 261 insulates upper contact 248 from lower contact 249 when the former is in the upper position illustrated. The base 262 serves as a conductor between lower contact 249 and a wire 175 which leads to the solenoid 160 of time delay valve 130 within control means 200.

When contact 248 engages contact 249 by action of solenoid 242, then the solenoid 160 of time delay valve 130 is connected to the source of electric energy by wires 173, 179, arm 245, contact 248, contact 249, and wire 175. As seen in FIGURE 1, the element 129 opens the larger passage 131 whereby retarding means 124, and hence spool 52, will move rapidly to quickly institute an anti-roll or anti-pitch correction as required.

With continued reference to FIGURE 5, when the vehicle leaves a curve and enters a stretch of straight road it is desirable to continue to maintain the time delay mechanism inoperative for a period of time after the centrifugal force has ceased and the mercury switch 165 has broken contact, in order that the control means 200 can rapidly, without time delay, make corrections in flexible casing 80, FIGURE 2, which corrections are required because centrifugal force is ceasing and the unequal spring forces, required in the curve to level the vehicle, are no longer required in the straight stretch of road being entered. Hence it is desirable to maintain the time delay mechanism inoperative and hence the solenoid 160 of the time delay switch 130, FIGURE 1, and the solenoid 242 of the holding relay 171 must both be maintained energized.

To maintain solenoids 242 and 160 energized after mercury switch 165 or the brake operated fluid actuated switch 240 has broken contact, a condenser 265 is connected in parallel with solenoid 242 of the holding relay. The plates 266 of the condenser are connected to wire 178 and plates 267 of the condenser are grounded by a wire 268.

When one of the switches 165 or 240 connects the source of electric energy 172 to the solenoid 242 of the holding relay, arm 245 is attracted downwardly to connect contacts 248 and 249 and condenser 265 is charged. So long as switch 162 or 240 is closed, the time delay switch 130 in control means 200 will remain connected to the source 172 and receive electric current therefrom. When the closed switch 165 or 240 is opened, as occurs in coming out of a curve or when the brake pressure used in stopping is decreased, then the condenser 265 will begin to release its stored charge and continue to discharge for a time interval whereby solenoid 242 remains energized and the contacts 248 and 249 are maintained in engagement subsequent to opening of switch 165 or 240.

When condenser 265 discharges the arm 245 is moved upwardly against stop 260 whereby time delay valve 130 is closed and control means 200 is rendered non-responsive to road imposed impacts of short time duration in the manner previously described.

It will be understood that each of the control means 200 of the present invention can be applied to each of the four wheels of a motor vehicle whereby anti-roll control, as well as corrections for variations in static weight change, is effected at each of the four wheels of the vehicle. As an alternative, if it is desired to effect anti-roll control at only say the front wheels of the vehicle, then a control means 200 would be applied at each of the front wheels of the vehicle, and a structurally more simple and less expensive control means, without a time delay control valve such as solenoid operated time delay control valve 130, could be utilized at the rear wheels of the vehicle. In such latter instance, corrections for static weight distribution would be made by a control means at each of the four wheels, but only the control means 200 at the right front wheel and the control means 200 at the left front wheel would rapidly institute anti-roll corrections in the manner described in detail herein.

While the forms of the present invention as herein disclosed constitute preferred forms, it is to be understood that other forms might be adopted, all coming within the scope of the claims which follow:

I claim:
1. In a vehicle of the type having an unsprung weight and a sprung weight, the combination of means interposed between said weight comprising an expansible and contractible air container; an air reservoir having an outlet connected with the container for supplying air to the container; a second air reservoir having an inlet connected with the container; valve means for controlling the flow of air from the first reservoir to the container and for controlling the flow of air from the container under pressure above atmospheric pressure to the second mentioned reservoir; an air compressor having a low pressure side and a high pressure side, said low pressure side being connected with the second mentioned reservoir, and said high pressure side being connected with the first mentioned reservoir, said air reservoirs, air container and compressor forming a circuit closed to atmosphere and said compressor maintaining a pressure above atmospheric pressure in said closed circuit; and pressure responsive valve means for maintaining the pressure in the second mentioned reservoir above atmospheric pressure, said second mentioned valve means including a valve for controlling the flow of air from the second reservoir to the compressor; and means responsive to pressure in the first mentioned reservoir for controlling said valve.

2. A system as defined in claim 1 characterized to include means responsive to a condition to which the vehicle is subjected for actuating the first mentioned valve means to control the flow of air from said air container to the second mentioned reservoir.

3. The apparatus defined in claim 1 wherein said first mentioned valve means includes a movable flow control element; and means forming a resilient connection between said movable flow control element and one of said weights.

4. The apparatus defined in claim 1 wherein said first mentioned valve means includes a movable flow control element; means forming a resilient connection between said movable flow control element and one of said weights; and fluid actuated retarding means for controlling the rate of movement of said flow control element.

5. The apparatus defined in claim 1 wherein said second mentioned valve means includes an air intake valve connected to atmosphere.

6. The apparatus defined in claim 1 wherein said second mentioned valve means includes a pressure relief valve.

7. The apparatus defined in claim 1 wherein said second mentioned valve means includes a self-closing inlet valve and a pressure relief valve.

8. The apparatus defined in claim 1 wherein said valve forms the intake valve for said compressor.

9. The apparatus defined in claim 1 wherein said last mentioned means includes a movable wall means exposed to pressure in said first mentioned reservoir and engageable with said valve.

References Cited in the file of this patent
UNITED STATES PATENTS

| | | |
|---|---|---|
| 1,105,805 | Liebowitz | Aug. 4, 1914 |
| 1,240,664 | Brown | Sept. 18, 1917 |
| 1,648,908 | Mercier | Nov. 15, 1927 |
| 1,653,110 | Valley | Dec. 20, 1927 |
| 1,664,510 | Hughes | Apr. 3, 1928 |
| 2,361,575 | Thompson | Oct. 31, 1944 |
| 2,475,701 | Eaton | July 12, 1949 |
| 2,778,656 | May | Jan. 22, 1957 |